US012739190B2

(12) United States Patent
Fujishiro

(10) Patent No.: US 12,739,190 B2
(45) Date of Patent: Sep. 15, 2026

(54) COMMUNICATION CONTROL METHOD FOR PROVIDING MULTICAST BROADCAST SERVICE BEARER SPLITTING

(71) Applicant: KYOCERA CORPORATION, Kyoto (JP)

(72) Inventor: Masato Fujishiro, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 373 days.

(21) Appl. No.: 18/303,646

(22) Filed: Apr. 20, 2023

(65) Prior Publication Data

US 2023/0261970 A1 Aug. 17, 2023

Related U.S. Application Data

(63) Continuation of application No. PCT/JP2021/038491, filed on Oct. 18, 2021.

(30) Foreign Application Priority Data

Oct. 20, 2020 (JP) ................................ 2020-176328

(51) Int. Cl.
*H04L 45/16* (2022.01)
*H04W 40/02* (2009.01)

(52) U.S. Cl.
CPC ............ *H04L 45/16* (2013.01); *H04W 40/02* (2013.01)

(58) Field of Classification Search
CPC ........ H04L 45/16; H04W 40/02; H04W 4/06; H04W 76/10
See application file for complete search history.

(56) References Cited

U.S. PATENT DOCUMENTS

2012/0170502 A1* 7/2012 Korus .................. H04W 72/30 370/312
2013/0128797 A1* 5/2013 Newberg .......... H04W 36/0007 370/312
2019/0222967 A1* 7/2019 Ratilainen ............ H04L 1/1887
2022/0046389 A1* 2/2022 Shrivastava ............ H04W 4/06
2022/0132277 A1* 4/2022 Shrivastava .......... H04W 76/28

(Continued)

FOREIGN PATENT DOCUMENTS

JP 2023-518859 A 5/2023
WO 2021/098106 A1 5/2021

OTHER PUBLICATIONS

3rd Generation Partnership Project; Technical Specification Group Radio Access Network; NR; NR and NG-RAN Overall Description; Stage 2 (Release 16); 3GPP TS 38.300 V16.3.0; Sep. 2020; pp. 1-148.

(Continued)

*Primary Examiner* — Afshawn M Towfighi
(74) *Attorney, Agent, or Firm* — Studebaker Brackett PLLC

(57) ABSTRACT

A communication control method used in a mobile communication system for providing an MBS includes configuring, by abase station, for a user equipment, a multicast broadcast service (MBS) bearer split into a point-to-point (PTP) communication path and a point-to-multipoint (PTM) communication path, and transmitting, by the base station, to the user equipment, an indication of individually activating or deactivating the PTP communication path and the PTM communication path.

5 Claims, 14 Drawing Sheets

(56) References Cited

U.S. PATENT DOCUMENTS

| | | | | |
|---|---|---|---|---|
| 2022/0369411 | A1* | 11/2022 | Agiwal | H04L 5/0053 |
| 2023/0070233 | A1* | 3/2023 | Shrivastava | H04W 76/27 |
| 2023/0082017 | A1* | 3/2023 | Hong | H04W 76/22<br>370/312 |
| 2023/0110505 | A1* | 4/2023 | Wang | H04L 1/08<br>370/331 |

OTHER PUBLICATIONS

Kyocera; "Consideration of dynamic PTM-PTP switching with service continuity for NR MBS"; Online; 3GPP TSG-RAN WG2 #113bis-e, R2-2103373; Apr. 12-20, 2021; Total 7 pages.

MediaTek Inc.; "UE Reception Model of MBS Radio Bearer and its Dynamic PTM/PTP switch"; 3GPP TSG-RAN WG2 Meeting #111 electronic; R2-2006575; Online, Aug. 17-28, 2020; total 16 pages.

* cited by examiner

MAC CE (1 octet)

| M1 | M2 | M3 | M4 | M5 | M6 | M7 | M8 |
|---|---|---|---|---|---|---|---|

FIG. 11

COMMUNICATION CONTROL METHOD FOR PROVIDING MULTICAST BROADCAST SERVICE BEARER SPLITTING

RELATED APPLICATIONS

The present application is a continuation based on PCT Application No. PCT/JP2021/038491, filed on Oct. 18, 2021, which claims the benefit of Japanese Patent Application No. 2020-176328 filed on Oct. 20, 2020. The content of which is incorporated by reference herein in their entirety.

TECHNICAL FIELD

The present disclosure relates to a communication control method used in a mobile communication system.

BACKGROUND OF INVENTION

In recent years, a mobile communication system of the fifth generation (5G) has attracted attention. New Radio (NR), which is a Radio Access Technology (RAT) of the 5G System, has features such as high speed, large capacity, high reliability, and low latency compared to Long Term Evolution (LTE), which is a fourth generation radio access technology.

CITATION LIST

Non-Patent Literature

Non-Patent Document 1: 3GPP Technical Specification "3GPP TS 38.300 V16.3.0 (2020-09)"

SUMMARY

A communication control method according to a first aspect is a communication control method used in a mobile communication system for providing a multicast broadcast service (MBS) from a base station to a user equipment, the communication control method including: configuring, by the base station, for a user equipment, an MBS bearer split into a point-to-point (PTP) communication path and a point-to-multipoint (PTM) communication path; and transmitting, by the base station, to the user equipment an indication of individually activating or deactivating the PTP communication path and the PTM communication path.

A communication control method according to a second aspect is a communication control method used in a mobile communication system for providing a multicast broadcast service (MBS), the communication control method including: configuring, by a base station, for a user equipment, an MBS bearer split into a point-to-point (PTP) communication path and a point-to-multipoint (PTM) communication path; determining, by the user equipment, whether a predetermined condition is satisfied after at least one selected from the group consisting of the PTP communication path and the PTM communication path is activated; and deactivating, by the user equipment, the activated communication path even if an indication of deactivating the at least one of the communication paths activated is not received from the base station when the predetermined condition is determined to be satisfied.

A communication control method according to a third aspect is a communication control method used in a mobile communication system for providing a multicast broadcast service (MBS), the communication control method including: configuring, by a base station, for a user equipment, an MBS bearer split into a point-to-point (PTP) communication path and a point-to-multipoint (PTM) communication path; determining, by the user equipment, whether a predetermined condition is satisfied; and deconfiguring, by the user equipment, the MBS bearer even if an indication of deconfiguring the MBS bearer is not received from the base station when the predetermined condition is determined to be satisfied.

A communication control method according to a fourth aspect is a communication control method used in a mobile communication system for providing a multicast broadcast service (MBS), the communication control method comprising: configuring, by a base station, an MBS bearer for a plurality of user equipments; and transmitting, by the base station, an indication of deconfiguring the MBS bearer to the plurality of user equipments by multicast.

BRIEF DESCRIPTION OF THE DRAWINGS

FIG. 11 is a diagram illustrating an example of a MAC CE storing an indication value for each bearer identifier (or logical channel identifier) according to an embodiment.

DESCRIPTION OF EMBODIMENTS

Introduction of multicast broadcast services to the 5G system (NR) has been under study. NR multicast broadcast services are desired to provide enhanced services compared to LTE multicast broadcast services.

The present invention provides enhanced multicast broadcast services.

A mobile communication system according to an embodiment is described with reference to the drawings. In the description of the drawings, the same or similar parts are denoted by the same or similar reference signs.

Figure 1:
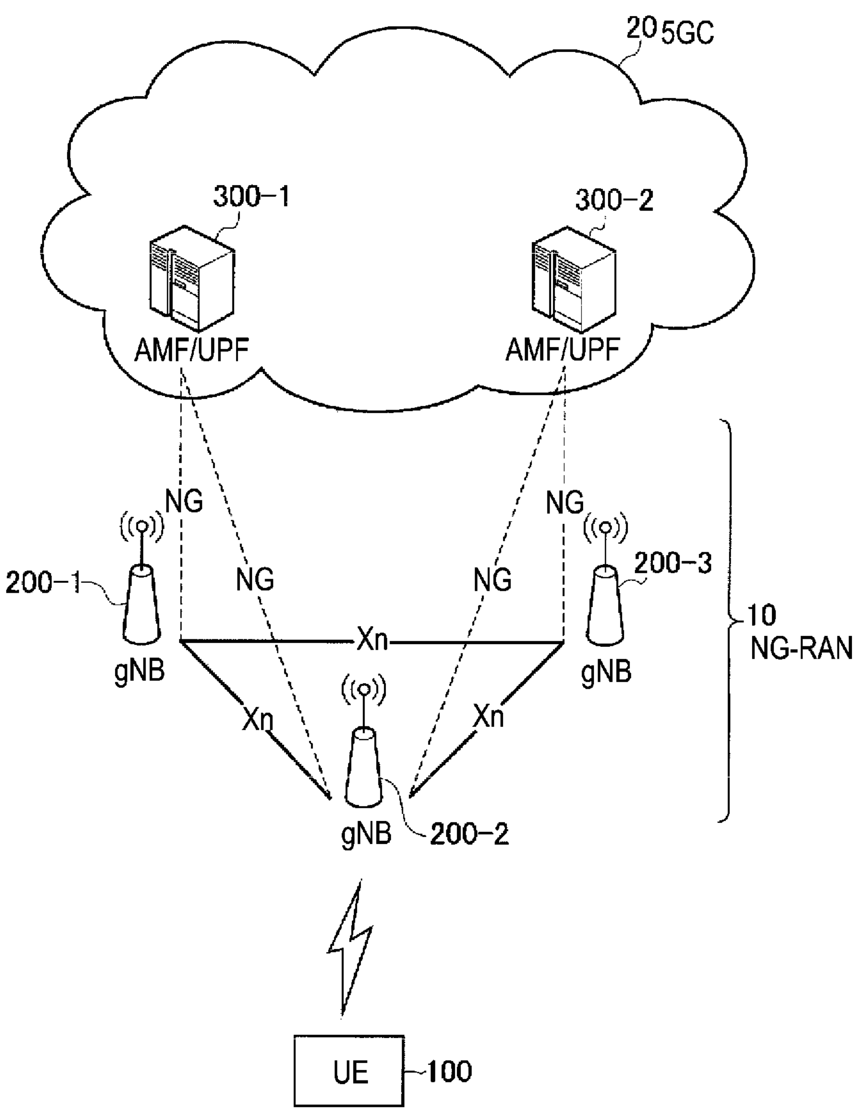
FIG. 1 is a diagram illustrating a configuration of a mobile communication system according to an embodiment.

Configuration of Mobile Communication System First, a configuration of a mobile communication system according to an embodiment is described. FIG. 1 is a diagram illustrating a configuration of the mobile communication system according to an embodiment. This mobile communication system complies with the 5th Generation System (5GS) of the 3GPP standard. The description below takes the 5GS as an example, but Long Term Evolution (LTE) system or the sixth generation (6G) system may be at least partially applied to the mobile communication system.

As illustrated in FIG. 1, the mobile communication system includes a user equipment (UE) 100, a 5G radio access network (next generation radio access network (NG-RAN)) 10, and a 5G core network (5GC) 20.

The UE 100 is a mobile wireless communication apparatus. The UE 100 may be any apparatus as long as utilized by a user. Examples of the UE 100 include a mobile phone terminal (including a smartphone), a tablet terminal, a notebook PC, a communication module (including a communication card or a chipset), a sensor or an apparatus provided on a sensor, a vehicle or an apparatus provided on a vehicle (Vehicle UE), or a flying object or an apparatus provided on a flying object (Aerial UE).

The NG-RAN 10 includes base stations (referred to as "gNBs" in the 5G system) 200. The gNBs 200 are interconnected via an Xn interface which is an inter-base station interface. Each gNB 200 manages one or a plurality of cells. The gNB 200 performs wireless communication with the UE 100 that has established a connection to the cell of the gNB 200. The gNB 200 has a radio resource management (RRM) function, a function of routing user data (hereinafter simply referred to as "data"), a measurement control function for mobility control and scheduling, and the like. The "cell" is used as a term representing a minimum unit of wireless communication area. The "cell" is also used as a term representing a function or a resource for performing wireless communication with the UE 100. One cell belongs to one carrier frequency.

Note that the gNB can be connected to an Evolved Packet Core (EPC) corresponding to a core network of LTE. An LTE base station can also be connected to the 5GC. The LTE base station and the gNB can be connected via an inter-base station interface.

The 5GC 20 includes an Access and Mobility Management Function (AMF) and a User Plane Function (UPF) 300. The AMF performs various types of mobility controls and the like for the UE 100. The AMF manages mobility of the UE 100 by communicating with the UE 100 by using Non-Access Stratum (NAS) signaling. The UPF controls data transfer. The AMF and UPF are connected to the gNB 200 via an NG interface which is an interface between a base station and the core network.

Figure 2:
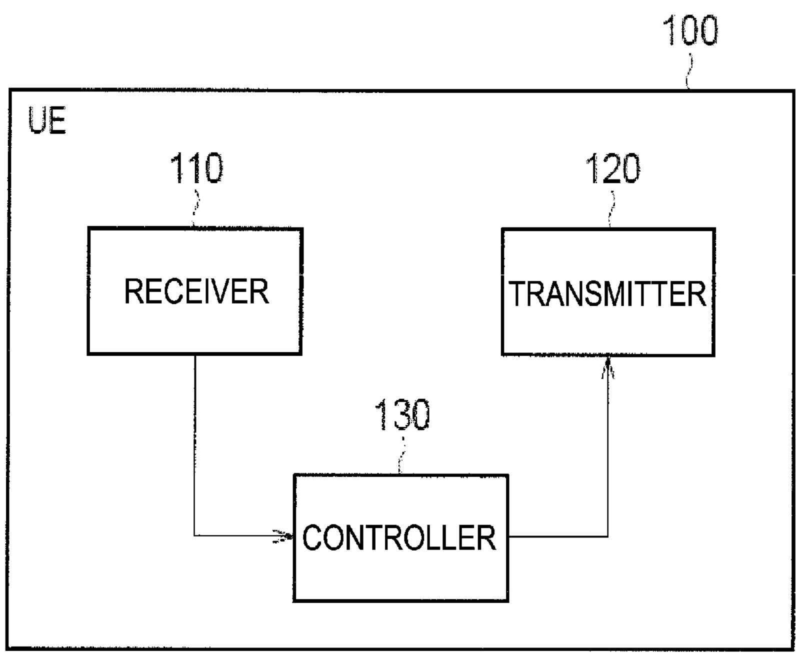
FIG. 2 is a diagram illustrating a configuration of a user equipment (UE) according to an embodiment.

FIG. 2 is a diagram illustrating a configuration of the UE 100 (user equipment) according to an embodiment.

As illustrated in FIG. 2, the UE 100 includes a receiver 110, a transmitter 120, and a controller 130.

The receiver 110 performs various types of reception under control of the controller 130. The receiver 110 includes an antenna and a reception device. The reception device converts a radio signal received through the antenna into a baseband signal (a reception signal) and outputs the resulting signal to the controller 130.

The transmitter 120 performs various types of transmission under control of the controller 130. The transmitter 120 includes an antenna and a transmission device. The transmission device converts a baseband signal output by the controller 130 (a transmission signal) into a radio signal and transmits the resulting signal through the antenna.

The controller 130 performs various types of control in the UE 100. The controller 130 includes at least one processor and at least one memory. The memory stores a program to be executed by the processor and information to be used for processing by the processor. The processor may include a baseband processor and a Central Processing Unit (CPU). The baseband processor performs modulation and demodulation, coding and decoding, and the like of a baseband signal. The CPU executes the program stored in the memory to thereby perform various types of processing.

Figure 3:
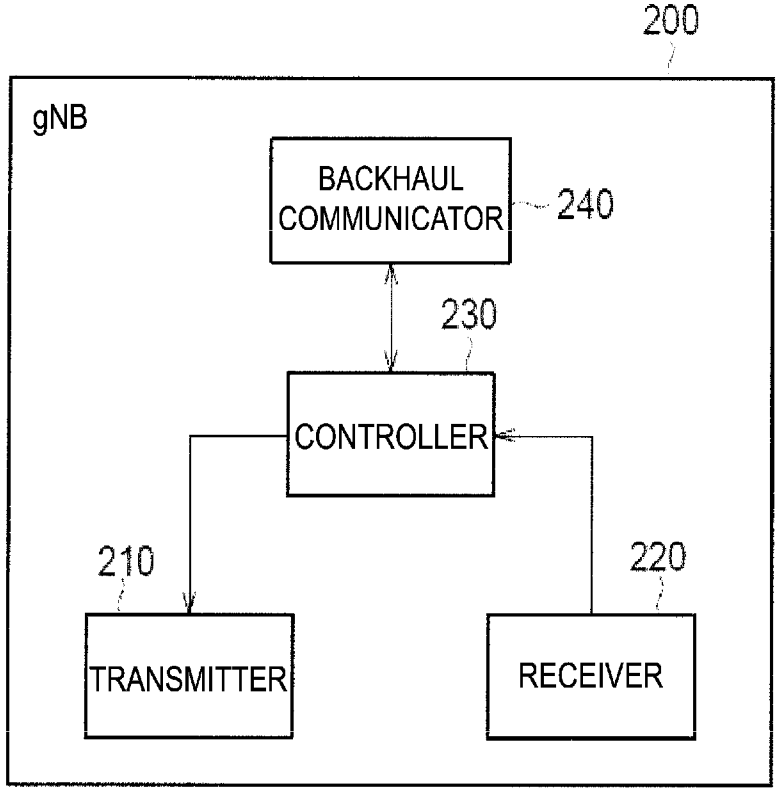
FIG. 3 is a diagram illustrating a configuration of a base station (gNB) according to an embodiment.

FIG. 3 is a diagram illustrating a configuration of the gNB 200 (base station) according to an embodiment.

As illustrated in FIG. 3, the gNB 200 includes a transmitter 210, a receiver 220, a controller 230, and a backhaul communicator 240.

The transmitter 210 performs various types of transmission under control of the controller 230. The transmitter 210 includes an antenna and a transmission device. The transmission device converts a baseband signal output by the controller 230 (a transmission signal) into a radio signal and transmits the resulting signal through the antenna.

The receiver 220 performs various types of reception under control of the controller 230. The receiver 220 includes an antenna and a reception device. The reception device converts a radio signal received through the antenna into a baseband signal (a reception signal) and outputs the resulting signal to the controller 230.

The controller 230 performs various types of controls for the gNB 200. The controller 230 includes at least one processor and at least one memory. The memory stores a program to be executed by the processor and information to be used for processing by the processor. The processor may include a baseband processor and a CPU. The baseband processor performs modulation and demodulation, coding and decoding, and the like of a baseband signal. The CPU executes the program stored in the memory to thereby perform various types of processing.

The backhaul communicator 240 is connected to a neighboring base station via the inter-base station interface. The backhaul communicator 240 is connected to the AMF/UPF 300 via the interface between a base station and the core network. Note that the gNB may include a Central Unit (CU) and a Distributed Unit (DU) (i.e., functions are divided), and both units may be connected via an F1 interface.

Figure 4:
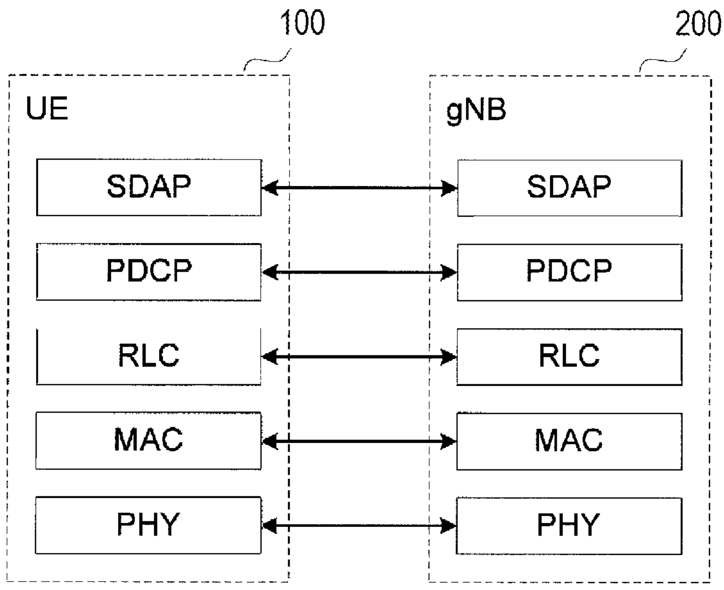
FIG. 4 is a diagram illustrating a configuration of a protocol stack of a radio interface of a user plane handling data.

FIG. 4 is a diagram illustrating a configuration of a protocol stack of a radio interface of a user plane handling data.

As illustrated in FIG. 4, a radio interface protocol of the user plane includes a physical (PHY) layer, a Medium Access Control (MAC) layer, a Radio Link Control (RLC) layer, a Packet Data Convergence Protocol (PDCP) layer, and a Service Data Adaptation Protocol (SDAP) layer.

The PHY layer performs coding and decoding, modulation and demodulation, antenna mapping and demapping, and resource mapping and demapping. Data and control information are transmitted between the PHY layer of the UE 100 and the PHY layer of the gNB 200 via a physical channel.

The MAC layer performs preferential control of data, retransmission processing using a hybrid ARQ (HARQ), a random access procedure, and the like. Data and control information are transmitted between the MAC layer of the UE 100 and the MAC layer of the gNB 200 via a transport channel. The MAC layer of the gNB 200 includes a scheduler. The scheduler determines transport formats (transport block sizes, modulation and coding schemes (MCSs)) in the uplink and the downlink and resource blocks to be allocated to the UE 100.

The RLC layer transmits data to the RLC layer on the reception side by using functions of the MAC layer and the PHY layer. Data and control information are transmitted between the RLC layer of the UE 100 and the RLC layer of the gNB 200 via a logical channel.

The PDCP layer performs header compression and decompression, and encryption and decryption.

The SDAP layer performs mapping between an IP flow as the unit of QoS control by a core network and a radio bearer as the unit of QoS control by an access stratum (AS). Note that, when the RAN is connected to the EPC, the SDAP may not be provided.

Figure 5:
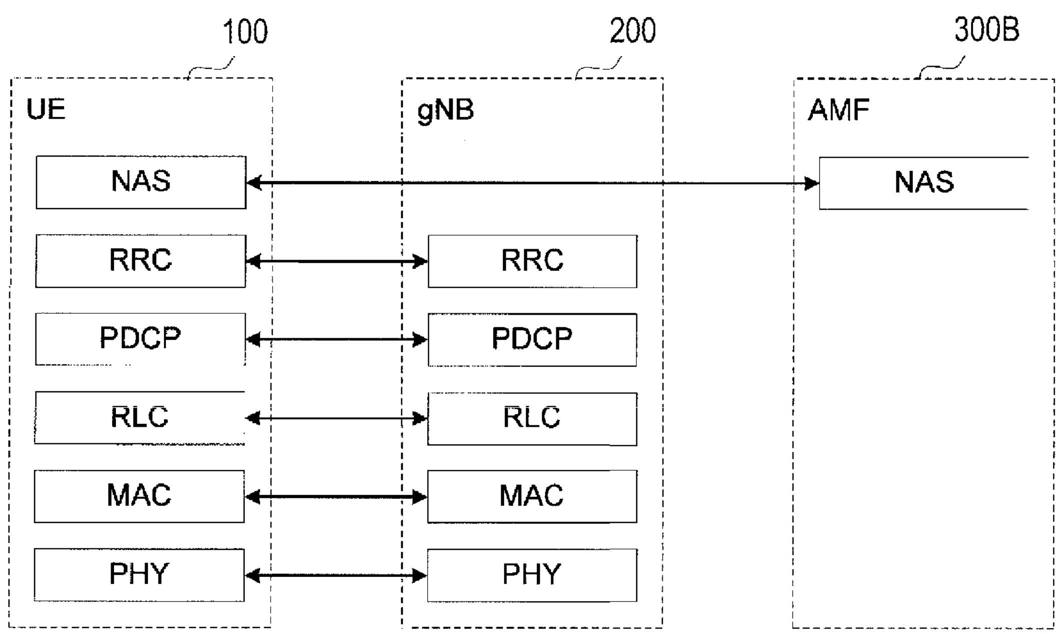
FIG. 5 is a diagram illustrating a configuration of a protocol stack of a radio interface of a control plane handling signaling (control signal).

FIG. 5 is a diagram illustrating a configuration of a protocol stack of a radio interface of a control plane handling signaling (control signal).

As illustrated in FIG. 5, the protocol stack of the radio interface of the control plane includes a Radio Resource Control (RRC) layer and a Non-Access Stratum (NAS) layer instead of the SDAP layer illustrated in FIG. 4.

RRC signaling for various configurations is transmitted between the RRC layer of the UE 100 and the RRC layer of the gNB 200. The RRC layer controls a logical channel, a transport channel, and a physical channel according to establishment, reestablishment, and release of a radio bearer. When a connection between the RRC of the UE 100 and the RRC of the gNB 200 (RRC connection) exists, the UE 100 is in an RRC connected state. When a connection between the RRC of the UE 100 and the RRC of the gNB 200 (RRC connection) does not exist, the UE 100 is in an RRC idle state. When the connection between the RRC of the UE 100 and the RRC of the gNB 200 is suspended, the UE 100 is in an RRC inactive state.

The NAS layer which is higher than the RRC layer performs session management, mobility management, and the like. NAS signaling is transmitted between the NAS layer of the UE 100 and the NAS layer of the AMF 300B.

Note that the UE 100 includes an application layer other than the protocol of the radio interface.

MBS

The MBS according to an embodiment is described. The MBS is a service in which the NG-RAN 10 provides broadcast or multicast, that is, point-to-multipoint (PTM) data transmission to the UE 100. The MBS may be referred to as the Multimedia Broadcast and Multicast Service (MBMS). Note that use cases (service types) of the MBS include public communication, mission critical communication, V2X (Vehicle to Everything) communication, IPv4 or IPv6 multicast delivery, IPTV, group communication, and software delivery.

Figure 6:
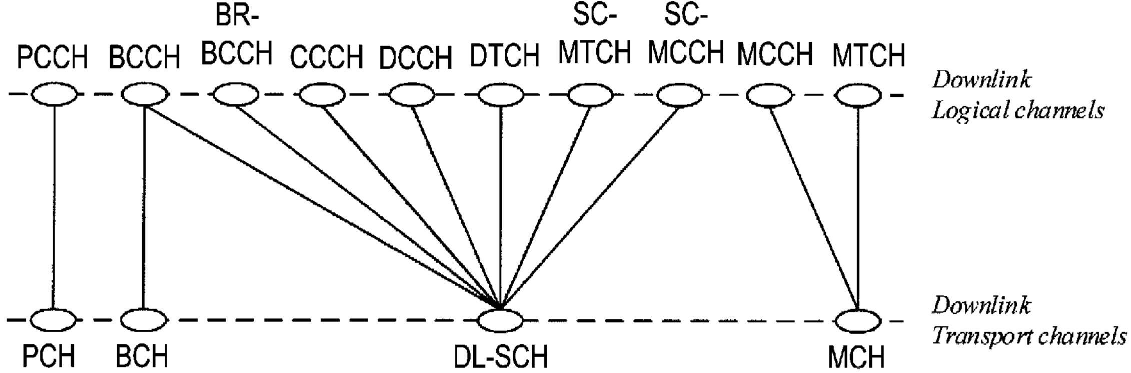
FIG. 6 is a diagram illustrating a correspondence relationship between a downlink Logical channel and a downlink Transport channel according to an embodiment.

MBS Transmission in LTE includes two schemes, i.e., a Multicast Broadcast Single Frequency Network (MBSFN) transmission and Single Cell Point-To-Multipoint (SC-PTM) transmission. FIG. 6 is a diagram illustrating a correspondence relationship between a downlink Logical channel and a downlink Transport channel according to an embodiment.

As illustrated in FIG. 6, the logical channels used for MBSFN transmission are a Multicast Traffic Channel (MTCH) and a Multicast Control Channel (MCCH), and the transport channel used for MBSFN transmission is a Multicast Control Channel (MCH). The MBSFN transmission is designed primarily for multi-cell transmission, and in an MBSFN area including a plurality of cells, each cell synchronously transmits the same signal (the same data) in the same MBSFN subframe.

The logical channels used for SC-PTM transmission are a Single Cell Multicast Traffic Channel (SC-MTCH) and a Single Cell Multicast Control Channel (SC-MCCH), and the transport channel used for SC-PTM transmission is a Downlink Shared Channel (DL-SCH). The SC-PTM transmission is primarily designed for single-cell transmission, and corresponds to broadcast or multicast data transmission on a cell-by-cell basis. The physical channels used for SC-PTM transmission are a Physical Downlink Control Channel (PDCCH) and a Physical Downlink Control Channel (PDSCH), and enables dynamic resource allocation.

Although an example will be mainly described below in which the MBS is provided using the SC-PTM transmission scheme, the MBS may be provided using the MBSFN transmission scheme. An example will be mainly described in which the MBS is provided using multicast. Accordingly, the MBS may be interpreted as multicast. Note that, the MBS may be provided using broadcast.

MBS data refers to data transmitted by the MBS, an MBS control channel refers to the MCCH or SC-MCCH, and an MBS traffic channel refers to the MTCH or SC-MTCH. However, the MBS data may be transmitted in unicast. The MBS data may be referred to as MBS packets or MBS traffic.

The network can provide different MBS services for respective MBS sessions. The MBS session is identified by at least one of Temporary Mobile Group Identity (TMGI) and a session identifier, and at least one of these identifiers is referred to as an MBS session identifier. Such an MBS session identifier may be referred to as an MBS service identifier or a multicast group identifier.

Figure 7:
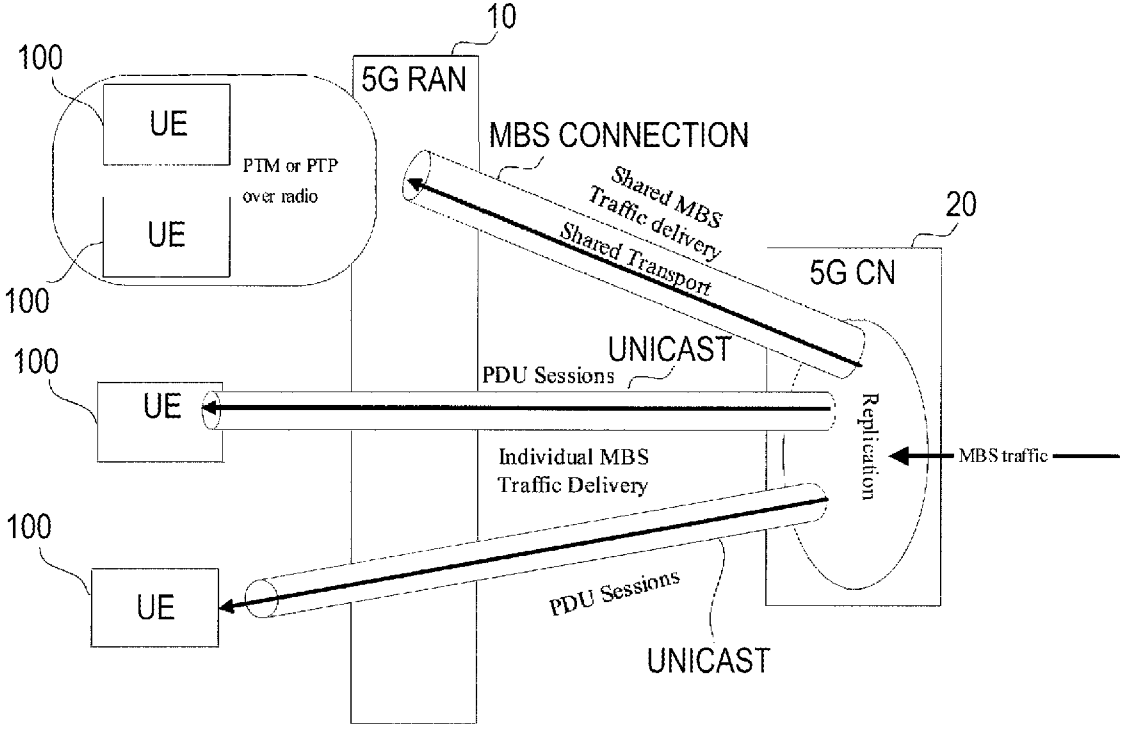
FIG. 7 is a diagram illustrating a delivery method of MBS data according to an embodiment.

FIG. 7 is a diagram illustrating a delivery method of the MBS data according to an embodiment.

As illustrated in FIG. 7, the MBS data (MBS traffic) is delivered from a single data source (application service provider) to a plurality of UEs. The 5G CN (5G) 20, which is a 5GC core network, receives the MBS data from the application service provider and performs replication of the MB S data to deliver the resultant.

From the perspective of the 5GC 20, two delivery methods are possible: shared MBS data delivery (shared MB S traffic delivery) and individual MBS data delivery (individual MBS traffic delivery).

In the shared MBS data delivery, a connection is established between the NG-RAN 10 that is a 5G radio access network (5G RAN) and the 5GC 20 to deliver the MBS data from the 5GC 20 to the NG-RAN 10. Such a connection (a tunnel) is hereinafter referred to as an “MB S connection”.

The MBS connection may be referred to as a shared MBS traffic delivery connection or a shared transport. The MBS connection terminates at the NG-RAN 10 (i.e., the gNB 200). The MBS connection may correspond to an MBS session on a one to-one basis. The gNB 200 selects any of PTP (Point-to-Point: unicast) and PTM (Point-to-Multipoint: multicast or broadcast) according to its own determination, and transmits the MBS data to the UE 100 using the selected method.

On the other hand, in the individual MBS data delivery, a unicast session is established between the NG-RAN 10 and the UE 100 to individually deliver the MBS data from the 5GC to the UE 100. Such unicast may be referred to as a PDU session. The unicast (PDU session) terminates at the UE 100.

Split MBS Bearer

The split MBS bearer according to an embodiment is described.

The gNB 200 may configure an MBS bearer split into a PTP communication path and a PTM communication path (hereinafter referred to as a "split MBS bearer" as appropriate) for the UE 100. This allows the gNB 200 to dynamically switch the transmission of the MBS data to the UE 100 between the PTP (PTP communication path) and the PTM (PTM communication path). The gNB 200 may perform duplication transmission of the same MBS data using both the PTP (PTP communication path) and the PTM (PTM communication path) to improve reliability.

A predetermined layer terminating the split is the MAC layer (HARQ), the RLC layer, the PDCP layer, or the SDAP layer. Although an example in which the predetermined layer terminating the split is the PDCP layer will be mainly described below, the predetermined layer may be the MAC layer (HARQ), the RLC layer, or the SDAP layer.

Figure 8:
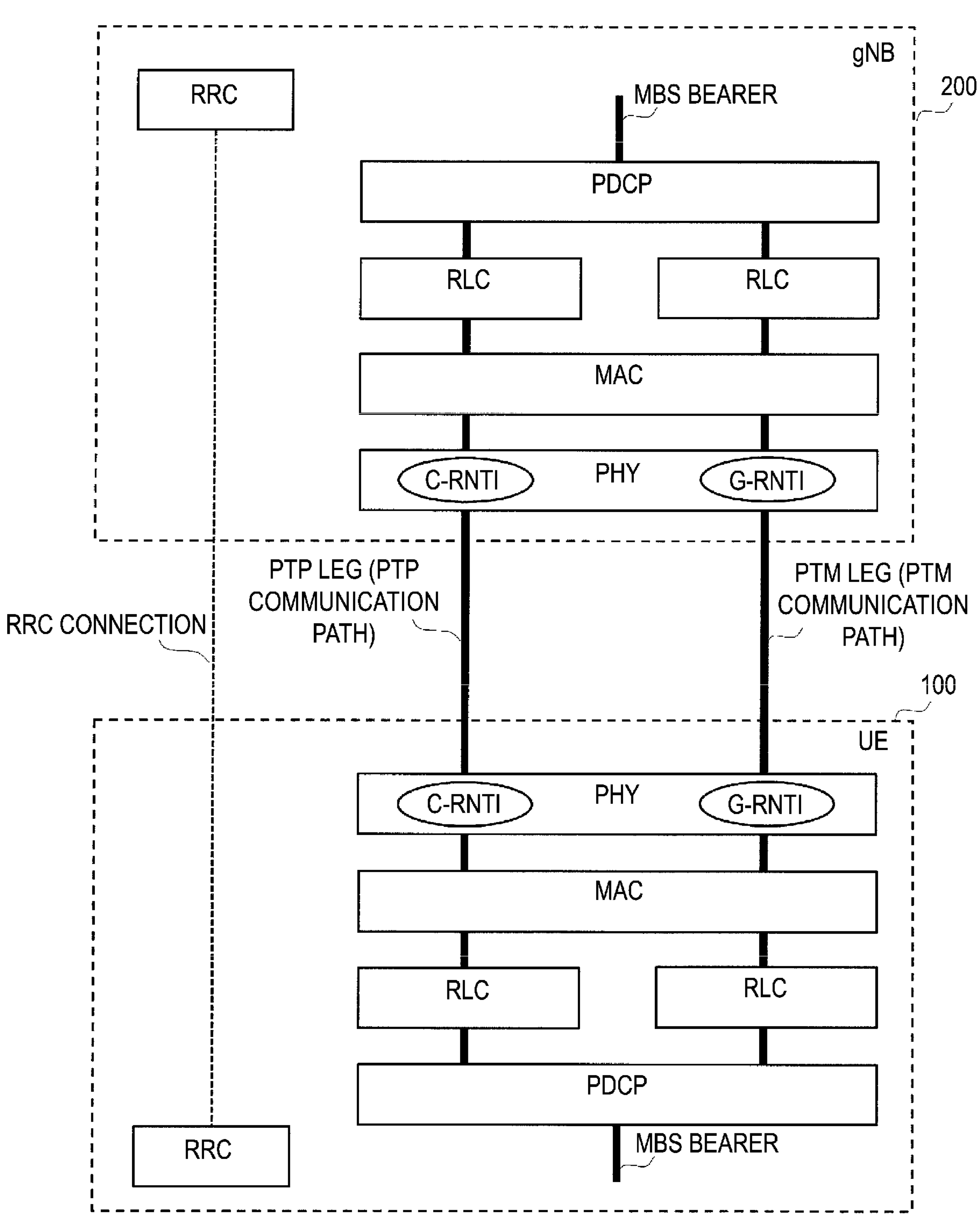
FIG. 8 is a diagram illustrating a split MBS bearer according to an embodiment.

FIG. 8 is a diagram illustrating the split MBS bearer according to an embodiment. Hereinafter, the PTP communication path is referred to as a PTP leg, and the PTM communication path is referred to as a PTM leg. A functional unit corresponding to each layer is referred to as an entity.

As illustrated in FIG. 8, each of the PDCP entity of the gNB 200 and the PDCP entity of the UE 100 splits an MBS bearer, which is a bearer (data radio bearer) used for the MBS, into a PTP leg and a PTM leg. Note that the PDCP entity is provided for each bearer.

Each of the gNB 200 and the UE 100 includes two RLC entities provided per leg, one MAC entity, and one PHY entity. The PHY entity may be provided per leg. Note that, in a dual connectivity in which the UE 100 communicates with two gNBs 200, the UE 100 may include two MAC entities.

The PHY entity transmits and receives data of the PTP leg using a cell RNTI (cell radio network temporary identifier (C-RNTI)) that is allocated to the UE 100 on a one-to-one basis. The PHY entity transmits and receives data of the PTM leg using a group RNTI (group radio network temporary identifier (G-RNTI)) allocated to the MBS session on a one-to-one basis. The C-RNTI is different for each UE 100, but the G-RNTI is an RNTI common to a plurality of UEs 100 receiving one MBS session.

In order to perform PTM transmission of the MBS data (multicast or broadcast) from the gNB 200 to the UE 100 using a PTM leg, a split MBS bearer needs to be configured for the UE 100 from the gNB 200 and the PTM leg needs to be activated. In other words, even if a split MBS bearer is configured for the UE 100, when a PTM leg is in a deactivation state, the gNB 200 cannot perform the PTM transmission of the MBS data using the PTM leg.

In order that the gNB 200 and the UE 100 perform PTP transmission of the MBS data (unicast) using a PTP leg, a split MBS bearer needs to be configured for the UE 100 from the gNB 200 and the PTP leg needs to be activated. In other words, even if a split MBS bearer is configured for the UE 100, when a PTP leg is in a deactivation state, the gNB 200 cannot perform the PTP transmission of the MBS data using the PTP leg.

When the PTM leg is in an activated state, the UE 100 monitors a physical downlink control channel (PDCCH) to which a G-RNTI associated with the MBS session is applied (i.e., performs blind decoding of the PDCCH using the G-RNTI). The UE 100 may monitor the PDCCH only at a scheduling occasion of the MBS session.

When the PTM leg is in a deactivated state, the UE 100 does not monitor a PDCCH to which a G-RNTI associated with the MBS session is applied (i.e., does not perform blind decoding of the PDCCH using the G-RNTI).

When the PTP leg is in an activated state, the UE 100 monitors a PDCCH to which a C-RNTI is applied. When discontinuous reception (DRX) in the PTP leg is configured, the UE 100 monitors a PDCCH for a configured OnDuration period. When a cell (frequency) associated with the MBS session is specified, the UE 100 may monitor a PDCCH for the cell even when the cell is deactivated.

When the PTP leg is in a deactivated state, the UE 100 may monitor a PDCCH to which a C-RNTI is applied in preparation for normal unicast downlink transmission of other than the MBS data. However, when a cell (frequency) associated with an MBS session is specified, the UE 100 may not monitor a PDCCH for the MBS session.

Note that it is assumed that the above-described split MBS bearer is configured by way of an RRC message transmitted from the RRC entity of the gNB 200 to the RRC entity of the UE 100. In the following, an operation for efficiently controlling a bearer split under the assumption that bearer split is performed will be mainly described.

Activation and Deactivation of Leg

The activation and deactivation of a leg according to an embodiment is described.

Figure 9:
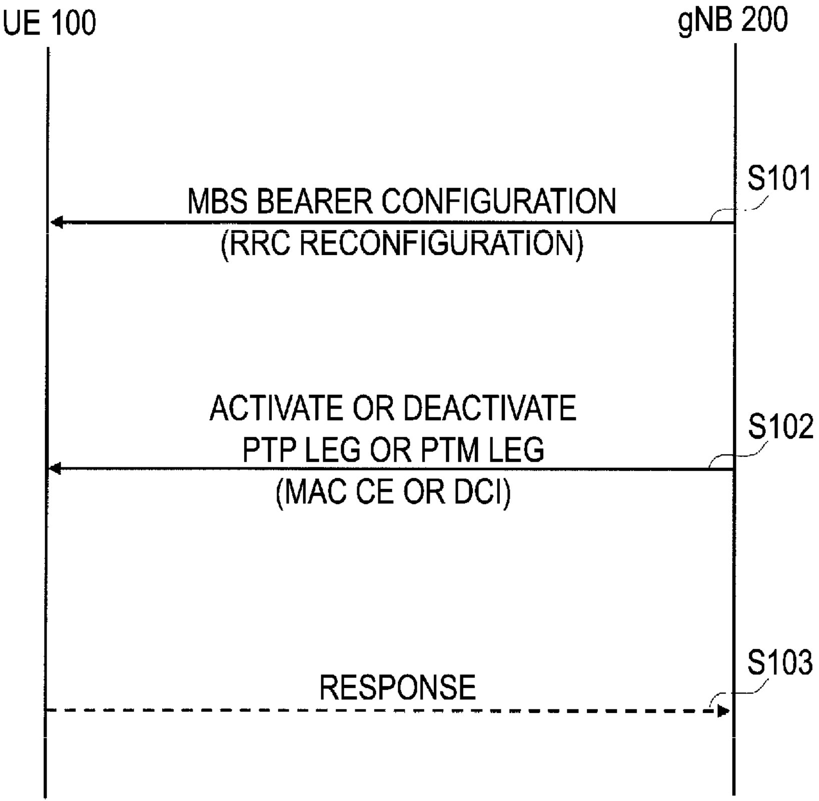
FIG. 9 is a diagram illustrating Operation Example 1 related to activation and deactivation of a leg according to an embodiment.

FIG. 9 is a diagram illustrating Operation Example 1 related to the activation and deactivation of a leg according to an embodiment.

As illustrated in FIG. 9, in step S101, the RRC entity of the gNB 200 transmits to the UE 100 an RRC message including a configuration of the split MBS bearer (split bearer) illustrated in FIG. 8. The RRC message may be an RRC Reconfiguration message, for example. The RRC entity of the UE 100 establishes a split MBS bearer based on the configuration included in the RRC message received from the gNB 200. In the following, although an example in which one split MBS bearer is established by the UE 100 is mainly described below, the UE 100 may establish a plurality of split MBS bearers depending on the configuration from the gNB 200.

The gNB 200, when configuring a bearer by use of the RRC message (RRC Reconfiguration message), may indicate an initial state of each leg (that is, activation or deactivation of each leg) to the UE 100 by use of the same message. The RRC entity of the gNB 200, when transmitting the RRC message including the bearer configuration of the split MBS bearer to the UE 100, includes the indication of the activation or deactivation of each leg together with the bearer configuration in the RRC message.

Such an RRC message may include an identifier of a leg (a PTP leg or a PTM leg) to be indicated and/or an identifier indicating any one of activation and deactivation. The RRC message may include an identifier (for example, a TMGI, a G-RNTI, a session identifier, a QoS flow identifier, or a bearer identifier) associated with the MBS session (split MBS bearer) to be indicated.

In step S102, the gNB 200 transmits to the UE 100 an indication of individually activating or deactivating the PTP leg and the PTM leg.

Here, the MAC entity of the gNB 200 may transmit a MAC control element (MAC CE) including the indication to the UE 100. The MAC entity of the UE 100 receives the MAC CE from gNB 200. The PHY entity of the gNB 200 may transmit downlink control information (DCI) including the indication to the UE 100. The PHY entity of the UE 100 receives the DCI from the gNB 200.

Such a MAC CE or DCI may include an identifier of a leg (a PTP leg or a PTM leg) to be indicated and/or an identifier indicating any one of activation and deactivation. The MAC CE or the DCI may include an identifier (for example, a TMGI, a G-RNTI, a session identifier, a QoS flow identifier, or a bearer identifier) associated with the MBS session (split MBS bearer) to be indicated.

Indicating the activation and deactivation of each leg by use of the MAC CE or the DCI allows more dynamic control compared with by use of the RRC message.

The UE 100, in response to receiving the indication of activating the PTP leg, starts data reception processing using the C-RNTI. The UE 100, in response to receiving the indication of activating the PTM leg, starts MBS data reception processing using the G-RNTI. On the other hand, the UE 100, in response to receiving the indication of deactivating the PTP leg, ends the data reception processing using the C-RNTI. The UE 100, in response to receiving the indication of deactivating the PTM leg, ends the MBS data reception processing using the G-RNTI.

In step S102, the gNB 200 may transmit an indication of activating or deactivating the PTP leg to the UE 100 via the PTM leg in the activated state (PTM transmission). This can collectively activate or deactivate the PTP legs of a plurality of UEs 100 via the PTM.

The gNB 200 may transmit an indication of deactivating the PTM leg to the UE 100 via the PTM leg in the activated state (PTM transmission). This can collectively deactivate the PTM legs of a plurality of UEs 100 via the PTM.

In step S102, the gNB 200 may transmit an indication of activating or deactivating the PTM leg to the UE 100 via the PTP leg in the activated state (PTP transmission). This can individually activate or deactivate the PTM leg for each UE 100.

The gNB 200 may transmit an indication of deactivating the PTP leg to the UE 100 via the PTP leg in the activated state (PTP transmission). This can individually deactivate the PTP leg for each UE 100.

In step S103, the UE 100, in response to receiving the indication of activating the PTP leg and/or the PTM leg from the gNB 200 in step S102, may transmit a response to the received indication to the gNB 200. This response may be transmitted from the MAC entity of the UE 100 to the gNB 200 via the PTP leg, for example. The UE 100, after transmitting the response, may start a data reception operation on the activated leg.

The gNB 200, in response to receiving the response from the UE 100, transmits data via the activated leg. In other words, the gNB 200, after receiving the response, starts a data transmission operation on the leg.

Note that the UE 100, in response to receiving the indication of deactivating the PTP leg and/or the PTM leg from the gNB 200 in step S102, may transmit a response to the received indication to the gNB 200.

Figure 10:
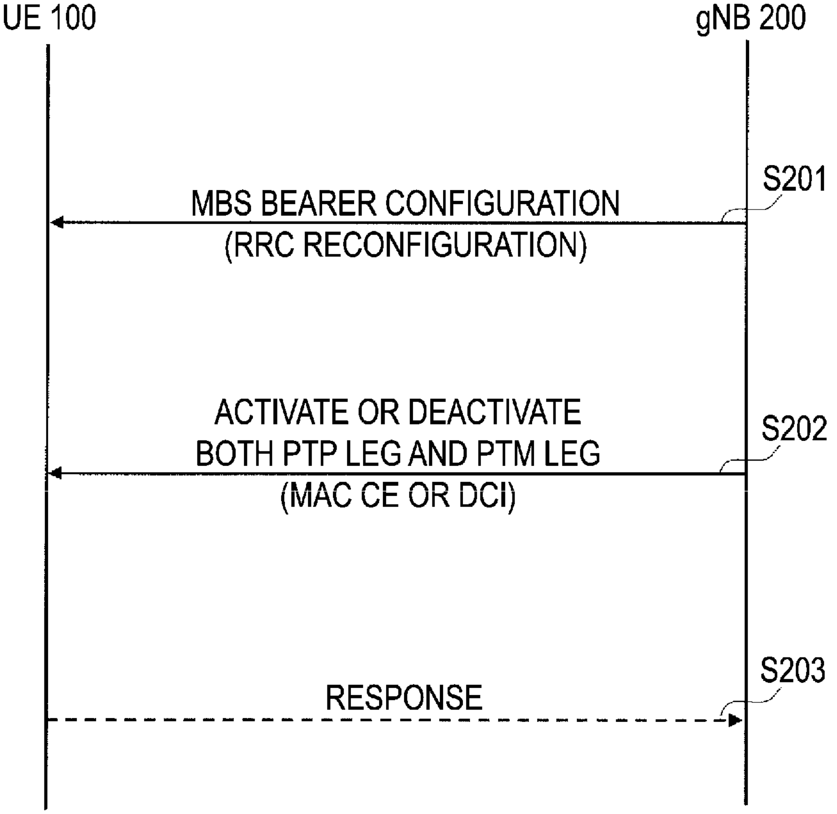
FIG. 10 is a diagram illustrating Operation Example 2 related to activation and deactivation of a leg according to an embodiment.

FIG. 10 is a diagram illustrating Operation Example 2 related to the activation and deactivation of a leg according to an embodiment. The basic operation of Operation Example 2 is the same as and/or similar to that of Operation Example 1, and thus, differences from Operation Example 1 are mainly described here. Note that Operation Example 2 can be used together with Operation Example 1.

In Operation Example 2, the gNB 200 transmits to the UE 100 an indication of activating or deactivating both the PTP leg and the PTM leg. For example, the MAC entity of the gNB 200 includes both a PTP leg control indication and a PTM leg control indication in the MAC CE indicating of activating or deactivating the leg.

As illustrated in FIG. 10, in step S201, the RRC entity of the gNB 200 transmits to the UE 100 an RRC message including a configuration of the split MBS bearer (split bearer) illustrated in FIG. 8. As described above, the RRC message may include information configuring an initial state of each leg. The information configuring the initial state of each leg may be information same as and/or similar to an indication included in the MAC CE or DCI described below.

In step S202, the gNB 200 transmits to the UE 100 an indication of activating or deactivating both the PTP leg and the PTM leg. As described above, the MAC CE or the DCI includes the indication.

Here, the MAC CE or the DCI includes an indication value of activation (for example, “1”) of both the PTP leg and the PTM leg, or deactivation (for example, “0”) of both the PTP leg and the PTM leg. The activation of both the PTP leg and the PTM leg may be activation of a split MBS bearer and/or activation of duplication transmission using two legs. The deactivation of both the PTP leg and the PTM leg may be deactivation of a split MBS bearer and/or deactivation of duplication transmission using two legs.

The MAC CE or the DCI may include an identifier (for example, a TMGI, a G-RNTI, a session identifier, a QoS flow identifier, or a bearer identifier) associated with the MBS session (split MBS bearer) to be indicated. The MAC CE or the DCI may include an indication of activation or deactivation for each such identifier.

Figure 11:
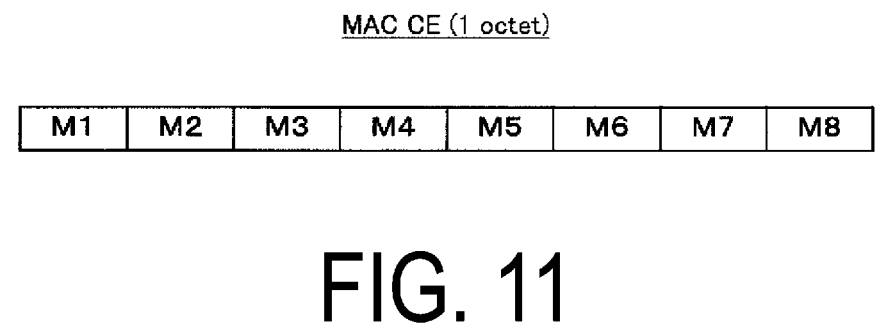

FIG. 11 is a diagram illustrating an example of a MAC CE (one octet) storing an indication value for each bearer identifier (or logical channel identifier) according to an embodiment. As illustrated in FIG. 11, in the MAC CE, M1 to M8 correspond to bearers #1 to #8 (or logical channels #1 to #8). Each of fields M1 to M8 is one bit, and an indication value of activation (for example, “1”) or deactivation (for example, “0”) is stored in each field.

Step S203 is the same as and/or similar to that in Operation Example 1. The UE 100 may transmit a response to the gNB 200.

In Operation Example 2, when both the PTP leg and the PTM leg are activated, the PDCP entity of the UE 100 may perform a duplicate packet discarding process on two identical MBS packets transmitted by duplication.

When the PTP leg is deactivated, the RRC entity of the UE 100 may transmit to the gNB 200 a message (RAI: release assistance information/preference) for prompting the gNB 200 to release the RRC connection. The UE 100 may be permitted to transmit the RAI even when dynamic switching between the PTP leg and the PTM leg is being configured.

Automatic Deactivation of Leg

Figure 12:
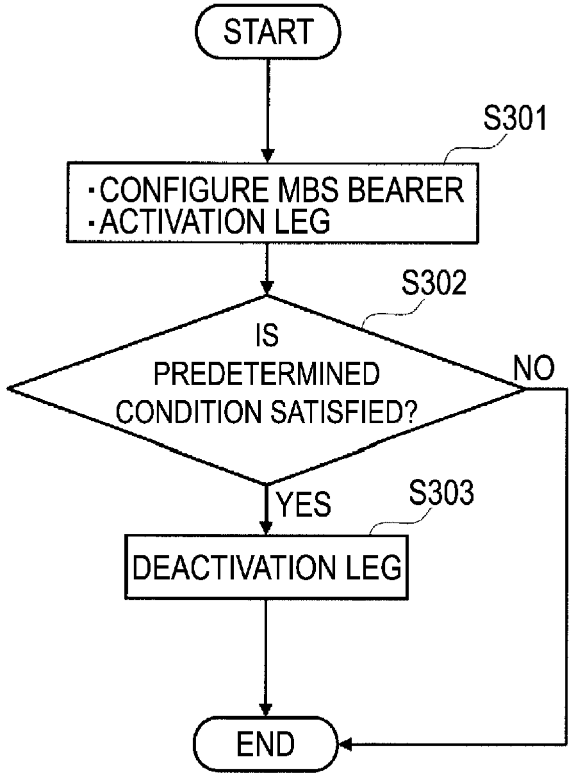
FIG. 12 is a diagram illustrating automatic deactivation of a leg according to an embodiment.

The automatic deactivation of a leg according to an embodiment is described. FIG. 12 is a diagram illustrating automatic deactivation of a leg according to an embodiment.

As illustrated in FIG. 12, in step S301, the gNB 200 and the UE 100 configure a split MBS bearer split into a PTP leg and a PTM leg. The gNB 200 activates the PTP leg and/or the PTM leg.

In step S302, the UE 100 determines whether a predetermined condition is satisfied after the PTP leg and/or the PTM leg is activated. The predetermined condition may be that no data is received from the gNB 200 on the activated leg for a predetermined period of time.

If the predetermined condition is determined to be satisfied (step S302: YES), then in step S303, the UE 100 deactivates the activated leg even if not receiving an indication of deactivating the activated leg from the gNB 200.

As a result, the UE 100 can voluntarily deactivate the activated leg on which the data is not received from the gNB 200, and thus, the UE 100 does not need to perform the reception processing (monitoring) on the leg, and power consumption of the UE 100 can be reduced.

The above-described predetermined period of time (timer value) may be configured for the UE 100 from the gNB 200 by way of an RRC message, for example. The timer values configured for the PTM leg and the PTP leg may be different from each other. When the timer value is configured, the UE 100 may consider that the gNB 200 permits the UE 100 to perform the automatic deactivation. The UE 100 resets the timer each time receiving the data on the activated leg and deactivates the leg when the timer expires.

Such automatic deactivation of a leg may be applicable only to a PTM leg or only to a PTP leg. The leg to which the automatic deactivation is applied may be configured (specified) for to UE 100 from gNB 200 by way of an RRC message, for example.

Note that as the predetermined condition described above, conditions the same as and/or similar to conditions 1 to 3 described below may be used.

Automatic Deconfiguration of MBS Bearer

The automatic deconfiguration of an MBS bearer according to an embodiment is described. Although an example in which the configuration of the split MBS bearer is automatically deconfigured is described here, a configuration of an unsplit MBS bearer may be automatically deconfigured.

Figure 13:
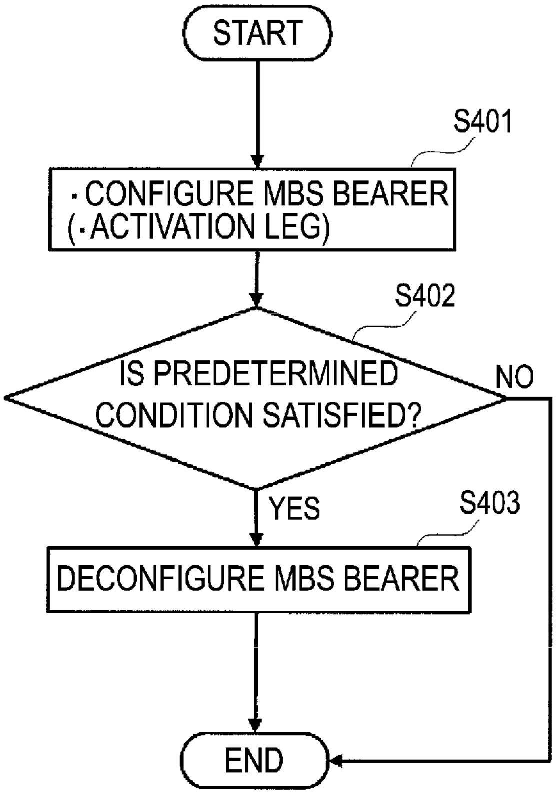
FIG. 13 is a diagram illustrating automatic deconfiguration of an MBS bearer according to an embodiment.

FIG. 13 is a diagram illustrating automatic deconfiguration of an MBS bearer according to an embodiment.

As illustrated in FIG. 13, in step S401, the gNB 200 and the UE 100 configure a split MBS bearer split into a PTP leg and a PTM leg. The gNB 200 may activate the PTP leg and/or the PTM leg.

In step S302, the UE 100 determines whether a predetermined condition is satisfied. The predetermined condition is one of, or a combination of two or more of, conditions 1 to 3 below.

Condition 1: a condition that both the PTP leg and the PTM leg are deactivated. For example, when both legs of one split MBS bearer are deactivated, the UE 100 determines that the bearer is deconfigured and discards the configuration (step S403).

The UE 100 may wait for a certain period of time to elapse after both legs are deactivated and deconfigure the MBS bearer when neither leg is activated before the certain period of time elapses. The certain period may be configured for the UE 100 from the gNB 200 by way of an RRC message, for example. For example, the UE 100 starts a timer when both legs are deactivated, stops the timer when either leg is activated, and deconfigures the MBS bearer when the timer expires.

Like the condition of the automatic deactivation of the leg described above, the condition 1 may be a condition that no data is received from the gNB 200 on both the PTP leg and the PTM leg for a predetermined period of time.

Condition 2: a condition that a notification indicating no interest in the MBS reception is transmitted from the UE 100 to the gNB 200.

For example, the UE 100, when not interested in the MBS reception, stops the MBS reception and notifies the gNB 200 that the UE 100 is not interested in the MBS reception. In this case, the UE 100 considers that the MBS bearer configuration is deconfigured and discards that bearer configuration (step S403).

The notification transmitted by the UE 100 may include an identifier for an MBS session that the UE 100 is not interested in the MBS reception. The notification may be transmitted from the UE 100 to the gNB 200 via the PTP leg.

This notification may be an RRC message transmitted to the gNB 200 or may be NAS signaling transmitted to the core network (e.g., the AMF).

Note that in the case of the NAS signaling, the core network (e.g., the AMF) may notify the gNB 200 of the bearer deconfiguration for the UE 100, or may exclude the UE 100 from the destination in the MBS connection (shared traffic). The split MBS bearer deconfiguration may be notified from the NAS layer to the AS layer in the UE 100.

The UE 100 in confirming that the gNB 200 can receive the notification through the ACK or the like of the lower layer, or in receiving the notification through the NAS signaling may consider that the split MBS bearer configuration is deconfigured to discard the bearer configuration.

Condition 3: the UE 100 determines that the MBS transmission from the gNB 200 is completed.

For example, the gNB 200, when completing the MBS transmission, transmits a notification (end marker) indicating the MBS transmission completion to the UE 100. The UE 100 determines the MBS transmission completion based on a session end time included in MBS session delivery schedule information (user service description (USD)) stored in advance. The UE 100, when determining that the MBS transmission is completed, considers that the MBS bearer configuration is deconfigured to discard the bearer configuration (step S403).

If the predetermined condition as described above is determined to be satisfied (step S402: YES), then in step S403, the UE 100 deconfigures the split MBS bearer (i.e., discards the configuration for the split MBS bearer) even if not receiving an indication of deconfiguring the split MBS bearer from the gNB 200. The UE 100 may deconfigure all of MBS dedicated configurations. In the UE 100, the deconfiguration of the split MBS bearer configuration may be notified to the higher layer (NAS). This notification may include information (cause) indicating contents of the condition satisfied in step S402.

In this way, the automatically deconfiguration of the unnecessary MBS bearer can eliminate the need for the gNB 200 to indicate the deconfiguration to each UE 100 while reducing the processing load and power consumption of the UE 100.

Multicast Deconfiguration

The deconfiguration according to an embodiment is described. In the automatic deconfiguration described above, the UE 100 voluntarily deconfigures the MBS bearer to improve efficiency. On the other hand, in the present example, an indication of deconfiguring the MBS bearer is transmitted in multicast from the gNB 200 to a plurality of UEs 100 to perform efficient deconfiguration. The MBS bearer to be deconfigured in multicast may be a split MBS bearer or an unsplit MBS bearer.

Figure 14:
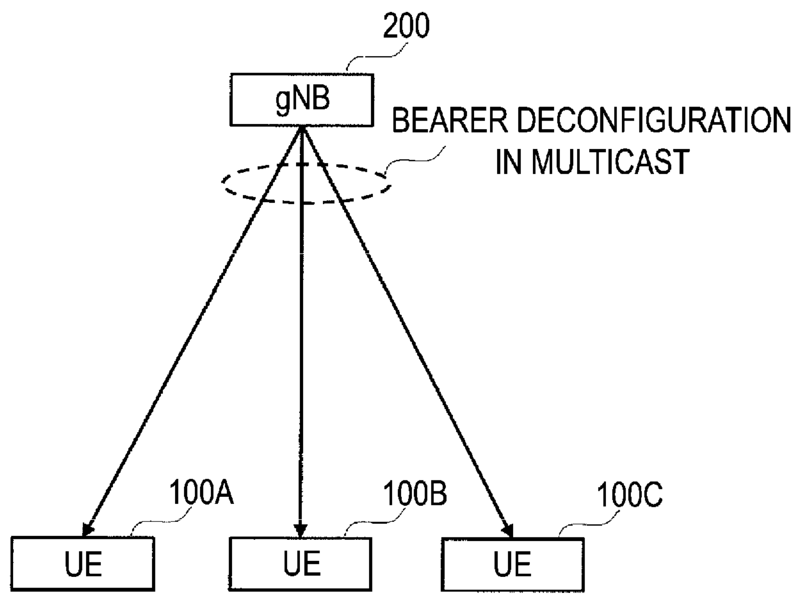
FIG. 14 is a diagram illustrating multicast deconfiguration according to an embodiment.

FIG. 14 is a diagram illustrating multicast deconfiguration according to an embodiment. In FIG. 14, it is assumed that each of a plurality of UEs 100 (UE 100A to 100C) establishes an MBS bearer with the gNB 200 and receives MBS data belonging to the same MBS session from the gNB 200.

When the gNB 200 determines to deconfigure the MBS bearers for the plurality of UEs 100, the gNB 200 transmits an indication of deconfiguring that MBS bearer using multicast (G-RNTI). The gNB 200 may transmit the indication of deconfiguring that MBS bearer via the PTM leg.

Such an MBS bearer deconfiguration indication is a MAC CE, an RRC message, an RLC Control PDU, a PDCP Control PDU, or an SDAP Control PDU. The gNB 200 may include, in the MBS bearer deconfiguration indication, an identifier (for example, a G-RNTI, a TMGI, a session identifier, a QoS flow identifier) for the MBS session of which the MBS bearer is to be deconfigured to explicitly indicate to the UE 100 which MBS bearer is to be deconfigured. When the MBS session corresponds to the G-RNTI on a one to-one basis, the G-RNTI used to transmit the MBS bearer deconfiguration indication may implicitly indicate which MBS bearer is to be deconfigured.

The UE 100, in receiving the MBS bearer deconfiguration indication from the gNB 200, deconfigures (discards) the target bearer configuration. The UE 100 may perform the deconfiguration (discard) immediately after receiving the MB S bearer deconfiguration indication, or may perform the deconfiguration (discard) at the completion of an MBS reception operation in a case during the MBS reception operation.

Other Embodiments

The operation flows described above can be separately and independently implemented, and also be implemented in combination of two or more of the operation flows. For example, some steps of one operation flow may be added to another operation flow, or some steps of one operation flow may be replaced with some steps of another operation flow.

In the embodiment described above, an example in which the base station is an NR base station (i.e., a gNB) is described; however, the base station may be an LTE base station (i.e., an eNB). The base station may be a relay node such as an integrated access and backhaul (IAB) node. The base station may be a distributed unit (DU) of the IAB node.

A program causing a computer to execute each of the processes performed by the UE 100 or the gNB 200 may be provided. The program may be recorded in a computer readable medium. Use of the computer readable medium enables the program to be installed on a computer. Here, the computer readable medium on which the program is recorded may be a non-transitory recording medium. The non-transitory recording medium is not particularly limited, and may be, for example, a recording medium such as a CD-ROM or a DVD-ROM.

Circuits for executing the processes to be performed by the UE 100 or the gNB 200 may be integrated, and at least part of the UE 100 or the gNB 200 may be configured as a semiconductor integrated circuit (a chipset or an SoC).

Embodiments have been described above in detail with reference to the drawings, but specific configurations are not limited to those described above, and various design variation can be made without departing from the gist of the present disclosure.

REFERENCE SIGNS

10: NG-RAN (5G RAN)
20: 5GC (5G CN)
100: UE
110: Receiver
120: Transmitter
130: Controller
200: gNB
210: Transmitter
220: Receiver
230: Controller
240: Backhaul communicator

The invention claimed is:

1. A communication control method used in a mobile communication system for providing a multicast broadcast service (MBS) from a network node to a user equipment, the communication control method comprising:

receiving, by the user equipment from the network node, a Radio Resource Control (RRC) message including information related to a multicast session; and when there is temporarily no data for the multicast session, in response to receiving the information included in the RRC message from the network node, stopping, by the user equipment, monitoring using a G-RNTI (Group Radio Network Temporary Identifier) for the multicast session.

2. A user equipment configured to receive a multicast broadcast service (MBS) from a network node, the user equipment comprising:

a receiver configured to receive from the network node, a Radio Resource Control (RRC) message including information related to a multicast session, and a controller configured to, when there is temporarily no data for the multicast session, in response to receiving the information included in the RRC message from the network node, stop monitoring using a G-RNTI (Group Radio Network Temporary Identifier) for the multicast session.

3. A chipset for a user equipment configured to receive a multicast broadcast service (MBS) from a network node, the chipset configured to execute processing of:

receiving from the network node, a Radio Resource Control (RRC) message including information related to a multicast session; and when there is temporarily no data for the multicast session, in response to receiving the information included in the RRC message from the network node, stopping monitoring using a G-RNTI (Group Radio Network Temporary Identifier) for the multicast session.

4. A non-transitory computer-readable medium comprising, stored thereupon, computer program instructions for execution by a user equipment, the program instructions being configured to cause the user equipment to execute processing of:

receiving from a network node, a Radio Resource Control (RRC) message including information related to a multicast session; and when there is temporarily no data for the multicast session, in response to receiving the information included in the RRC message from the network node, stopping monitoring using a G-RNTI (Group Radio Network Temporary Identifier) for the multicast session.

5. A system comprising:

a network node, and a user equipment configured to receive a multicast broadcast service (MBS) from the network node, wherein the user equipment is configured to receive from the network node, a Radio Resource Control (RRC) message including information related to a multicast session, and when there is temporarily no data for the multicast session, in response to receiving the information included in the RRC message from the network node, stop monitoring using a G-RNTI (Group Radio Network Temporary Identifier) for the multicast session.

* * * * *